US008746464B2

(12) United States Patent
Maier

(10) Patent No.: US 8,746,464 B2
(45) Date of Patent: Jun. 10, 2014

(54) STATIC FLUID SEPARATOR DEVICE

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 1028 days.

(21) Appl. No.: 12/443,090

(22) PCT Filed: Sep. 26, 2007

(86) PCT No.: PCT/US2007/020768
§ 371 (c)(1),
(2), (4) Date: May 7, 2009

(87) PCT Pub. No.: WO2008/039491
PCT Pub. Date: Apr. 3, 2008

(65) Prior Publication Data
US 2010/0072121 A1 Mar. 25, 2010

Related U.S. Application Data

(60) Provisional application No. 60/847,354, filed on Sep. 26, 2006.

(51) Int. Cl.
*B04C 3/06* (2006.01)
*B04C 11/00* (2006.01)
*B01D 45/16* (2006.01)
*B01D 19/00* (2006.01)
*B04C 3/00* (2006.01)

(52) U.S. Cl.
CPC .............. *B04C 3/06* (2013.01); *B04C 2003/006* (2013.01); *B04C 11/00* (2013.01); *B01D 45/16* (2013.01); *B01D 19/0057* (2013.01)
USPC ........ 210/512.1; 210/196; 210/197; 210/304; 210/305; 55/447; 55/442; 55/392; 96/206

(58) Field of Classification Search
CPC .............. B06C 3/06; B06C 3/04; B06C 3/00; B06C 2003/00; B06C 2003/003; B06C 2003/006; B06C 2009/008; B06C 7/00; B06C 9/00; B06C 11/00; B01D 17/0217; B01D 19/0052; B01D 19/0057; B01D 19/0094; B01D 21/26; B01D 21/265; B01D 21/267; B01D 45/08; B01D 45/12; B01D 45/16; B01D 45/14
USPC .............. 55/398; 210/512.1, 512.2, 787, 788, 210/512.3, 196, 197, 304, 305, 790, 799; 95/269, 216, 219; 96/204, 206, 220
See application file for complete search history.

(56) References Cited

U.S. PATENT DOCUMENTS 815,812 A 3/1906 Gow
1,057,613 A 4/1913 Baldwin
(Continued)

FOREIGN PATENT DOCUMENTS

CA 2647511 10/2007
EP 301285 10/1991
(Continued)

OTHER PUBLICATIONS

International Search Report of the International Searching Authority for Patent Cooperation Treaty Application No. PCT/US2007/020768, dated Mar. 3, 2008, pp. 1-3.
(Continued)

*Primary Examiner* — David C Mellon
(74) *Attorney, Agent, or Firm* — Edmonds & Nolte, PC

(57) ABSTRACT

A fluid separator includes a casing and a tubular main body disposed in the casing and having a central axis, inlet and outlet ends spaced along the axis, inner and outer circumferential surfaces; and drain passage(s) extending radially between the inner and outer surfaces. A collection chamber is defined between the outer surface and the casing and the inner surface defines a central flow passage, such that liquid contacting the inner surface flows through the drain passage(s) and into the collection chamber. A deflector disposed within the flow passage includes a hub located on the central axis with a bore and a plurality of vanes extending radially between the hub and the main body inner surface. Each vane has a first channeling surface facing toward the body inlet and a second channeling surface facing away from the inlet. Recirculation members fluidly connect the collection chamber with the hub bore.

22 Claims, 9 Drawing Sheets

(56) References Cited

U.S. PATENT DOCUMENTS

| | | | |
|---|---|---|---|
| 1,061,656 A | 5/1913 | Black | |
| 1,480,775 A | 1/1924 | Marien | |
| 1,622,768 A | 3/1927 | Cook et al. | |
| 1,642,454 A | 9/1927 | Malmstrom | |
| 2,006,244 A | 6/1935 | Kopsa | |
| 2,193,883 A * | 3/1940 | Reeves | 55/337 |
| 2,300,766 A | 11/1942 | Baumann | |
| 2,328,031 A | 8/1943 | Risley | |
| 2,345,437 A | 3/1944 | Tinker | |
| 2,602,462 A | 7/1952 | Barrett | |
| 2,811,303 A | 10/1957 | Ault et al. | |
| 2,836,117 A | 5/1958 | Lankford | |
| 2,868,565 A | 1/1959 | Suderow | |
| 2,897,917 A | 8/1959 | Hunter | |
| 2,932,360 A | 4/1960 | Hungate | |
| 2,954,841 A | 10/1960 | Reistle | |
| 3,044,657 A | 7/1962 | Horton | |
| 3,191,364 A | 6/1965 | Sylvan | |
| 3,198,214 A | 8/1965 | Lorenz | |
| 3,204,696 A | 9/1965 | De Priester et al. | |
| 3,213,794 A | 10/1965 | Adams | |
| 3,220,245 A | 11/1965 | Van Winkle | |
| 3,258,895 A * | 7/1966 | Wiebe et al. | 95/269 |
| 3,273,325 A | 9/1966 | Gerhold | |
| 3,352,577 A | 11/1967 | Medney | |
| 3,360,908 A * | 1/1968 | Baily | 55/347 |
| 3,395,511 A | 8/1968 | Akerman | |
| 3,420,434 A | 1/1969 | Swearingen | |
| 3,431,747 A | 3/1969 | Hasheimi et al. | |
| 3,454,163 A | 7/1969 | Read | |
| 3,487,432 A | 12/1969 | Jenson | |
| 3,490,209 A | 1/1970 | Fernandes et al. | |
| 3,498,028 A * | 3/1970 | Trouw | 96/306 |
| 3,500,614 A | 3/1970 | Soo | |
| 3,517,821 A * | 6/1970 | Keller et al. | 210/512.1 |
| 3,578,342 A | 5/1971 | Satterthwaite et al. | |
| 3,628,812 A | 12/1971 | Larraide et al. | |
| 3,672,733 A | 6/1972 | Arsenius et al. | |
| 3,693,329 A * | 9/1972 | Willis | 55/457 |
| 3,814,486 A | 6/1974 | Schurger | |
| 3,829,179 A | 8/1974 | Kurita et al. | |
| 3,884,660 A * | 5/1975 | Perry et al. | 55/396 |
| 3,915,673 A | 10/1975 | Tamai et al. | |
| 3,975,123 A | 8/1976 | Schibbye | |
| 4,033,647 A | 7/1977 | Beavers | |
| 4,059,364 A | 11/1977 | Andersen et al. | |
| 4,078,809 A | 3/1978 | Garrick et al. | |
| 4,087,261 A | 5/1978 | Hays | |
| 4,103,899 A | 8/1978 | Turner | |
| 4,112,687 A | 9/1978 | Dixon | |
| 4,117,359 A | 9/1978 | Wehde | |
| 4,135,542 A | 1/1979 | Chisholm | |
| 4,141,283 A | 2/1979 | Swanson et al. | |
| 4,146,261 A | 3/1979 | Edmaier et al. | |
| 4,165,622 A | 8/1979 | Brown, Jr. | |
| 4,174,925 A | 11/1979 | Pfenning et al. | |
| 4,180,391 A * | 12/1979 | Perry et al. | 55/324 |
| 4,182,480 A | 1/1980 | Theyse et al. | |
| 4,197,990 A | 4/1980 | Carberg et al. | |
| 4,205,927 A | 6/1980 | Simmons | |
| 4,227,373 A | 10/1980 | Amend et al. | |
| 4,258,551 A | 3/1981 | Ritzi | |
| 4,259,045 A | 3/1981 | Teruyama | |
| 4,278,200 A | 7/1981 | Gunnewig | |
| 4,298,311 A | 11/1981 | Ritzi | |
| 4,333,748 A | 6/1982 | Erickson | |
| 4,334,592 A | 6/1982 | Fair | |
| 4,336,693 A | 6/1982 | Hays et al. | |
| 4,339,923 A | 7/1982 | Hays et al. | |
| 4,347,900 A | 9/1982 | Barrington | |
| 4,363,608 A | 12/1982 | Mulders | |
| 4,374,583 A | 2/1983 | Barrington | |
| 4,375,975 A | 3/1983 | McNicholas | |
| 4,382,804 A | 5/1983 | Mellor | |
| 4,384,724 A | 5/1983 | Derman et al. | |
| 4,391,102 A | 7/1983 | Studhalter et al. | |
| 4,396,361 A | 8/1983 | Fraser | |
| 4,432,470 A | 2/1984 | Sopha | |
| 4,438,638 A | 3/1984 | Hays et al. | |
| 4,441,322 A | 4/1984 | Ritzi | |
| 4,442,925 A | 4/1984 | Fukushima et al. | |
| 4,453,893 A | 6/1984 | Hutmaker | |
| 4,463,567 A | 8/1984 | Amend et al. | |
| 4,468,234 A | 8/1984 | McNicholas | |
| 4,471,795 A | 9/1984 | Linhardt | |
| 4,477,223 A | 10/1984 | Giroux | |
| 4,502,839 A | 3/1985 | Maddox et al. | |
| 4,511,309 A | 4/1985 | Maddox | |
| 4,531,888 A | 7/1985 | Buchelt | |
| 4,536,134 A | 8/1985 | Huiber | |
| 4,541,531 A | 9/1985 | Brule | |
| 4,541,607 A | 9/1985 | Hotger | |
| 4,573,527 A | 3/1986 | McDonough | |
| 4,574,815 A | 3/1986 | West et al. | |
| 4,648,806 A | 3/1987 | Alexander | |
| 4,687,017 A | 8/1987 | Danko et al. | |
| 4,737,081 A | 4/1988 | Nakajima et al. | |
| 4,752,185 A | 6/1988 | Butler et al. | |
| 4,807,664 A | 2/1989 | Wilson et al. | |
| 4,813,495 A | 3/1989 | Leach | |
| 4,821,737 A | 4/1989 | Nelson | |
| 4,826,403 A | 5/1989 | Catlow | |
| 4,830,331 A | 5/1989 | Vindum | |
| 4,832,709 A | 5/1989 | Nagyszalanczy | |
| 4,904,284 A | 2/1990 | Hanabusa | |
| 4,908,051 A * | 3/1990 | Kiselev | 55/457 |
| 4,984,830 A | 1/1991 | Saunders | |
| 5,007,328 A | 4/1991 | Otteman | |
| 5,024,585 A | 6/1991 | Kralovec | |
| 5,043,617 A | 8/1991 | Rostron | |
| 5,044,701 A | 9/1991 | Watanabe et al. | |
| 5,045,046 A | 9/1991 | Bond | |
| 5,054,995 A | 10/1991 | Kaseley et al. | |
| 5,064,452 A | 11/1991 | Yano et al. | |
| 5,080,137 A | 1/1992 | Adams | |
| 5,129,930 A * | 7/1992 | Gauthier et al. | 55/394 |
| 5,190,440 A | 3/1993 | Maier et al. | |
| 5,202,024 A | 4/1993 | Andersson et al. | |
| 5,202,026 A | 4/1993 | Lema | |
| 5,203,891 A | 4/1993 | Lema | |
| 5,207,810 A | 5/1993 | Sheth | |
| 5,211,427 A | 5/1993 | Washizu | |
| 5,246,346 A | 9/1993 | Schiesser | |
| 5,285,123 A | 2/1994 | Kataoka et al. | |
| 5,306,051 A | 4/1994 | Loker et al. | |
| 5,337,779 A | 8/1994 | Fukuhara | |
| 5,378,121 A | 1/1995 | Hackett | |
| 5,385,446 A | 1/1995 | Hays | |
| 5,421,708 A | 6/1995 | Utter | |
| 5,443,581 A | 8/1995 | Malone | |
| 5,484,521 A | 1/1996 | Kramer | |
| 5,496,394 A | 3/1996 | Nied | |
| 5,500,039 A | 3/1996 | Mori et al. | |
| 5,525,034 A | 6/1996 | Hays | |
| 5,525,146 A | 6/1996 | Straub | |
| 5,531,811 A | 7/1996 | Kloberdanz | |
| 5,538,259 A | 7/1996 | Uhrner et al. | |
| 5,542,831 A | 8/1996 | Scarfone | |
| 5,575,309 A | 11/1996 | Connell | |
| 5,585,000 A | 12/1996 | Sassi | |
| 5,605,172 A | 2/1997 | Schubert et al. | |
| 5,628,623 A | 5/1997 | Skaggs | |
| 5,634,492 A | 6/1997 | Steinruck et al. | |
| 5,640,472 A | 6/1997 | Meinzer et al. | |
| 5,641,280 A | 6/1997 | Timuska | |
| 5,653,347 A | 8/1997 | Larsson | |
| 5,664,420 A | 9/1997 | Hays | |
| 5,682,759 A | 11/1997 | Hays | |
| 5,683,235 A | 11/1997 | Welch | |
| 5,685,691 A | 11/1997 | Hays | |
| 5,687,249 A | 11/1997 | Kato | |
| 5,693,125 A | 12/1997 | Dean | |
| 5,703,424 A | 12/1997 | Dorman | |
| 5,709,528 A | 1/1998 | Hablanian | |

(56) References Cited

U.S. PATENT DOCUMENTS

| | | |
|---|---|---|
| 5,713,720 A | 2/1998 | Barhoum |
| 5,720,799 A | 2/1998 | Hays |
| 5,750,040 A | 5/1998 | Hays |
| 5,775,882 A | 7/1998 | Kiyokawa et al. |
| 5,779,619 A | 7/1998 | Borgstrom et al. |
| 5,795,135 A | 8/1998 | Nyilas et al. |
| 5,800,092 A | 9/1998 | Nill et al. |
| 5,848,616 A | 12/1998 | Vogel et al. |
| 5,850,857 A | 12/1998 | Simpson |
| 5,853,585 A | 12/1998 | Nesseth |
| 5,863,023 A | 1/1999 | Evans et al. |
| 5,899,435 A | 5/1999 | Mitsch et al. |
| 5,935,053 A | 8/1999 | Strid |
| 5,938,803 A | 8/1999 | Dries |
| 5,938,819 A | 8/1999 | Seery |
| 5,946,915 A | 9/1999 | Hays |
| 5,951,066 A | 9/1999 | Lane et al. |
| 5,965,022 A | 10/1999 | Gould |
| 5,967,746 A | 10/1999 | Hagi et al. |
| 5,971,702 A | 10/1999 | Afton et al. |
| 5,971,907 A | 10/1999 | Johannemann et al. |
| 5,980,218 A | 11/1999 | Takahashi et al. |
| 5,988,524 A | 11/1999 | Odajima et al. |
| 6,035,934 A | 3/2000 | Stevenson et al. |
| 6,056,798 A * | 5/2000 | Cox ........................... 55/319 |
| 6,059,539 A | 5/2000 | Nyilas et al. |
| 6,068,447 A | 5/2000 | Foege |
| 6,090,174 A | 7/2000 | Douma et al. |
| 6,090,299 A | 7/2000 | Hays et al. |
| 6,113,675 A | 9/2000 | Branstetter |
| 6,122,915 A | 9/2000 | Hays |
| 6,123,363 A | 9/2000 | Burgard et al. |
| 6,145,844 A | 11/2000 | Waggott |
| 6,149,825 A | 11/2000 | Gargas |
| 6,151,881 A | 11/2000 | Ai et al. |
| 6,196,962 B1 | 3/2001 | Purvey et al. |
| 6,206,202 B1 | 3/2001 | Galk et al. |
| 6,214,075 B1 | 4/2001 | Filges et al. |
| 6,217,637 B1 | 4/2001 | Toney et al. |
| 6,227,379 B1 | 5/2001 | Nesseth |
| 6,277,278 B1 | 8/2001 | Conrad et al. |
| 6,312,021 B1 | 11/2001 | Thomas |
| 6,314,738 B1 | 11/2001 | Hays |
| 6,372,006 B1 | 4/2002 | Pregenzer et al. |
| 6,375,437 B1 | 4/2002 | Nolan |
| 6,383,262 B1 | 5/2002 | Marthinsen et al. |
| 6,394,764 B1 | 5/2002 | Samurin |
| 6,398,973 B1 | 6/2002 | Saunders et al. |
| 6,402,465 B1 | 6/2002 | Maier |
| 6,426,010 B1 | 7/2002 | Lecoffre et al. |
| 6,464,469 B1 | 10/2002 | Grob et al. |
| 6,467,988 B1 | 10/2002 | Czachor et al. |
| 6,468,426 B1 | 10/2002 | Klass |
| 6,485,536 B1 | 11/2002 | Masters |
| 6,514,322 B2 * | 2/2003 | West ........................... 95/269 |
| 6,530,484 B1 | 3/2003 | Bosman |
| 6,530,979 B2 | 3/2003 | Firey |
| 6,531,066 B1 | 3/2003 | Saunders et al. |
| 6,537,035 B2 | 3/2003 | Shumway |
| 6,540,917 B1 | 4/2003 | Richards et al. |
| 6,547,037 B2 | 4/2003 | Kuzdzal |
| 6,592,654 B2 | 7/2003 | Brown |
| 6,596,046 B2 | 7/2003 | Conrad et al. |
| 6,599,086 B2 | 7/2003 | Soja |
| 6,607,348 B2 | 8/2003 | Jean |
| 6,616,719 B1 | 9/2003 | Sun et al. |
| 6,617,731 B1 | 9/2003 | Goodnick |
| 6,629,825 B2 | 10/2003 | Stickland et al. |
| 6,631,617 B1 | 10/2003 | Dreiman et al. |
| 6,658,986 B2 | 12/2003 | Pitla et al. |
| 6,659,143 B1 | 12/2003 | Taylor et al. |
| 6,669,845 B2 | 12/2003 | Klass |
| 6,688,802 B2 | 2/2004 | Ross et al. |
| 6,707,200 B2 | 3/2004 | Carroll et al. |
| 6,718,955 B1 | 4/2004 | Knight |
| 6,719,830 B2 | 4/2004 | Illingworth et al. |
| 6,764,284 B2 | 7/2004 | Oehman, Jr. |
| 6,776,812 B2 | 8/2004 | Komura et al. |
| 6,802,693 B2 | 10/2004 | Reinfeld et al. |
| 6,802,881 B2 | 10/2004 | Illingworth et al. |
| 6,811,713 B2 | 11/2004 | Arnaud |
| 6,817,846 B2 | 11/2004 | Bennitt |
| 6,837,913 B2 | 1/2005 | Schilling et al. |
| 6,843,836 B2 | 1/2005 | Kitchener |
| 6,878,187 B1 | 4/2005 | Hays et al. |
| 6,893,208 B2 | 5/2005 | Frosini et al. |
| 6,907,933 B2 | 6/2005 | Choi et al. |
| 6,979,358 B2 | 12/2005 | Ekker |
| 7,001,448 B1 | 2/2006 | West |
| 7,013,978 B2 | 3/2006 | Appleford et al. |
| 7,022,150 B2 | 4/2006 | Borgstrom et al. |
| 7,022,153 B2 | 4/2006 | McKenzie |
| 7,025,890 B2 | 4/2006 | Moya |
| 7,033,410 B2 | 4/2006 | Hilpert et al. |
| 7,033,411 B2 | 4/2006 | Carlsson et al. |
| 7,056,363 B2 | 6/2006 | Carlsson et al. |
| 7,063,465 B1 | 6/2006 | Wilkes et al. |
| 7,112,036 B2 | 9/2006 | Lubell et al. |
| 7,131,292 B2 | 11/2006 | Ikegami et al. |
| 7,144,226 B2 | 12/2006 | Pugnet et al. |
| 7,159,723 B2 | 1/2007 | Hilpert et al. |
| 7,160,518 B2 | 1/2007 | Chen et al. |
| 7,169,305 B2 | 1/2007 | Gomez |
| 7,185,447 B2 | 3/2007 | Arbeiter |
| 7,204,241 B2 | 4/2007 | Thompson |
| 7,241,392 B2 | 7/2007 | Maier |
| 7,244,111 B2 | 7/2007 | Suter et al. |
| 7,258,713 B2 | 8/2007 | Eubank et al. |
| 7,270,145 B2 | 9/2007 | Koezler |
| 7,288,202 B2 | 10/2007 | Maier |
| 7,314,560 B2 | 1/2008 | Yoshida et al. |
| 7,323,023 B2 | 1/2008 | Michele et al. |
| 7,328,749 B2 | 2/2008 | Reitz |
| 7,335,313 B2 | 2/2008 | Moya |
| 7,377,110 B2 | 5/2008 | Sheridan et al. |
| 7,381,235 B2 | 6/2008 | Koene et al. |
| 7,396,373 B2 | 7/2008 | Lagerstedt et al. |
| 7,399,412 B2 | 7/2008 | Keuschnigg |
| 7,435,290 B2 | 10/2008 | Lane et al. |
| 7,445,653 B2 | 11/2008 | Trautmann et al. |
| 7,470,299 B2 | 12/2008 | Han et al. |
| 7,473,083 B2 | 1/2009 | Oh et al. |
| 7,479,171 B2 | 1/2009 | Cho et al. |
| 7,494,523 B2 | 2/2009 | Oh et al. |
| 7,501,002 B2 | 3/2009 | Han et al. |
| 7,520,210 B2 | 4/2009 | Theodore, Jr. et al. |
| 7,575,422 B2 | 8/2009 | Bode et al. |
| 7,578,863 B2 | 8/2009 | Becker et al. |
| 7,591,882 B2 | 9/2009 | Harazim |
| 7,594,941 B2 | 9/2009 | Zheng et al. |
| 7,594,942 B2 | 9/2009 | Polderman |
| 7,610,955 B2 | 11/2009 | Irwin, Jr. |
| 7,628,836 B2 | 12/2009 | Baronet et al. |
| 7,637,699 B2 | 12/2009 | Albrecht |
| 7,674,377 B2 | 3/2010 | Crew |
| 7,677,308 B2 | 3/2010 | Kolle |
| 7,691,185 B2 * | 4/2010 | Darke et al. ................. 95/269 |
| 7,708,537 B2 | 5/2010 | Bhatia et al. |
| 7,708,808 B1 | 5/2010 | Heumann |
| 7,744,663 B2 | 6/2010 | Wallace |
| 7,748,079 B2 | 7/2010 | McDowell et al. |
| 7,766,989 B2 | 8/2010 | Lane et al. |
| 7,811,344 B1 | 10/2010 | Duke et al. |
| 7,811,347 B2 | 10/2010 | Carlsson et al. |
| 7,815,415 B2 | 10/2010 | Kanezawa et al. |
| 7,824,458 B2 | 11/2010 | Borgstrom et al. |
| 7,824,459 B2 | 11/2010 | Borgstrom et al. |
| 7,846,228 B1 | 12/2010 | Saaski et al. |
| 2001/0007283 A1 | 7/2001 | Johal et al. |
| 2002/0009361 A1 | 1/2002 | Reichert et al. |
| 2003/0029318 A1 | 2/2003 | Firey |
| 2003/0035718 A1 | 2/2003 | Langston et al. |
| 2003/0136094 A1 | 7/2003 | Illingworth et al. |
| 2004/0007261 A1 | 1/2004 | Cornwell |

(56) References Cited

U.S. PATENT DOCUMENTS

| | | | |
|---|---|---|---|
| 2004/0170505 A1 | 9/2004 | Lenderink et al. |
| 2005/0173337 A1 | 8/2005 | Costinel |
| 2006/0065609 A1 | 3/2006 | Arthur |
| 2006/0090430 A1 | 5/2006 | Trautman et al. |
| 2006/0096933 A1 | 5/2006 | Maier |
| 2006/0157251 A1 | 7/2006 | Stinessen et al. |
| 2006/0157406 A1 | 7/2006 | Maier |
| 2006/0193728 A1 | 8/2006 | Lindsey et al. |
| 2006/0222515 A1 | 10/2006 | Delmotte et al. |
| 2006/0230933 A1 | 10/2006 | Harazim |
| 2006/0239831 A1 | 10/2006 | Garris, Jr. |
| 2006/0254659 A1 | 11/2006 | Ballott et al. |
| 2006/0275160 A1 | 12/2006 | Leu et al. |
| 2007/0029091 A1 | 2/2007 | Stinessen et al. |
| 2007/0036646 A1 | 2/2007 | Nguyen et al. |
| 2007/0051245 A1 | 3/2007 | Yun |
| 2007/0062374 A1 | 3/2007 | Kolle |
| 2007/0065317 A1 | 3/2007 | Stock |
| 2007/0084340 A1 | 4/2007 | Dou et al. |
| 2007/0140870 A1 | 6/2007 | Fukanuma et al. |
| 2007/0151922 A1 | 7/2007 | Mian |
| 2007/0163215 A1 | 7/2007 | Lagerstadt |
| 2007/0172363 A1 | 7/2007 | Laboube et al. |
| 2007/0196215 A1 | 8/2007 | Frosini et al. |
| 2007/0227969 A1 | 10/2007 | Dehaene et al. |
| 2007/0294986 A1 | 12/2007 | Beetz |
| 2008/0031732 A1 | 2/2008 | Peer et al. |
| 2008/0039732 A9 | 2/2008 | Bowman |
| 2008/0246281 A1 | 10/2008 | Agrawal et al. |
| 2008/0315812 A1 | 12/2008 | Balboul |
| 2009/0013658 A1 | 1/2009 | Borgstrom et al. |
| 2009/0015012 A1 | 1/2009 | Metzler et al. |
| 2009/0025562 A1 | 1/2009 | Hallgren et al. |
| 2009/0025563 A1 | 1/2009 | Borgstrom et al. |
| 2009/0151928 A1 | 6/2009 | Lawson |
| 2009/0159523 A1 | 6/2009 | McCutchen |
| 2009/0169407 A1 | 7/2009 | Yun |
| 2009/0173095 A1 | 7/2009 | Bhatia et al. |
| 2009/0266231 A1 | 10/2009 | Franzen et al. |
| 2009/0304496 A1 | 12/2009 | Maier |
| 2009/0321343 A1 | 12/2009 | Maier |
| 2009/0324391 A1 | 12/2009 | Maier |
| 2010/0007133 A1 | 1/2010 | Maier |
| 2010/0021292 A1 | 1/2010 | Maier et al. |
| 2010/0038309 A1 | 2/2010 | Maier |
| 2010/0043288 A1 | 2/2010 | Wallace |
| 2010/0043364 A1 | 2/2010 | Curien |
| 2010/0044966 A1 | 2/2010 | Majot et al. |
| 2010/0072121 A1 | 3/2010 | Maier |
| 2010/0074768 A1 | 3/2010 | Maier |
| 2010/0083690 A1 | 4/2010 | Sato et al. |
| 2010/0090087 A1 | 4/2010 | Maier |
| 2010/0143172 A1 | 6/2010 | Sato et al. |
| 2010/0163232 A1 | 7/2010 | Koll |
| 2010/0183438 A1 | 7/2010 | Maier et al. |
| 2010/0239419 A1 | 9/2010 | Maier et al. |
| 2010/0239437 A1 | 9/2010 | Maier |
| 2010/0247299 A1 | 9/2010 | Maier |
| 2010/0257827 A1 | 10/2010 | Lane et al. |
| 2011/0017307 A1 | 1/2011 | Kidd et al. |
| 2011/0061536 A1 | 3/2011 | Maier et al. |

FOREIGN PATENT DOCUMENTS

| | | |
|---|---|---|
| EP | 1582703 | 10/2005 |
| EP | 2013479 | 1/2009 |
| EP | 7838631.5 | 12/2009 |
| GB | 2323639 | 9/1998 |
| GB | 2337561 | 11/1999 |
| JP | 54099206 | 1/1978 |
| JP | 08 068501 | 3/1996 |
| JP | 8-284961 A | 11/1996 |
| JP | 2002 242699 | 8/2002 |
| JP | 2004034017 A | 2/2004 |
| JP | 3711028 | 10/2005 |
| JP | 2005291202 | 10/2005 |
| KR | 2009085521 | 2/2008 |
| MX | 2008012579 | 12/2008 |
| WO | 9524563 | 9/1995 |
| WO | 0117096 | 3/2001 |
| WO | 2007043889 | 4/2007 |
| WO | 2007103248 | 9/2007 |
| WO | 2007120506 | 10/2007 |
| WO | 2008036221 | 3/2008 |
| WO | 2008039446 | 3/2008 |
| WO | 2008039491 | 4/2008 |
| WO | 2008039731 | 4/2008 |
| WO | 2008039732 | 4/2008 |
| WO | 2008039733 | 4/2008 |
| WO | 2008039734 | 4/2008 |
| WO | 2008036394 | 7/2008 |
| WO | 2009111616 | 9/2009 |
| WO | 2009158252 | 12/2009 |
| WO | 2009158253 | 12/2009 |
| WO | 2010083416 | 7/2010 |
| WO | 2010083427 | 7/2010 |
| WO | 2010107579 | 9/2010 |
| WO | 2010110992 | 9/2010 |
| WO | 2011034764 | 3/2011 |

OTHER PUBLICATIONS

Technical Manual—High Pressure Air Compressor Model 13NL45; Navsea 86220-AT-MMA-010/93236, pp. 3-23 to 3-32, Electric Boat Corporation, Groton, CT 06340, Oct. 28, 1991.
PCT/US2007/008149 International Preliminary Report on Patentability dated Sep. 30, 2008.
PCT/US2007/008149 International Search Report and Written Opinion dated Jul. 17, 2008.
PCT/US2007/020101 International Preliminary Report on Patentability dated Apr. 2, 2009.
PCT/US2007/020101 International Search Report dated Apr. 29, 2008.
PCT/US2007/020101 Written Opinion dated Mar. 19, 2009.
PCT/US2007/020471 International Preliminary Report on Patentability dated Apr. 2, 2009.
PCT/US2007/020471 International Search Report and Written Opinion dated Apr. 1, 2008.
PCT/US2007/020659 International Preliminary Report on Patentability dated Mar. 31, 2009.
PCT/US2007/020659 International Search Report and Written Opinion dated Sep. 17, 2008.
PCT/US2007/020768 International Preliminary Report on Patentability dated Mar. 31, 2009.
PCT/US2007/020768 International Search Report and Written Opinion dated Mar. 3, 2008.
PCT/US2007/079348 International Preliminary Report on Patentability dated Mar. 31, 2009.
PCT/US2007/079348 International Search Report dated Apr. 11, 2008.
PCT/US2007/079348 Written Opinion dated Jan. 25, 2008.
PCT/US2007/079349 International Preliminary Report on Patentability dated Mar. 31, 2009.
PCT/US2007/079349 International Search Report and Written Opinion dated Apr. 2, 2008.
PCT/US2007/079350 International Preliminary Report on Patentability dated Mar. 31, 2009.
PCT/US2007/079350 International Search Report dated Jul. 17, 2008.
PCT/US2007/079350 Written Opinion dated Mar. 25, 2009.
PCT/US2007/079352 International Preliminary Report on Patentability dated Mar. 31, 2009.
PCT/US2007/079352 International Search Report and Written Opinion dated Aug. 27, 2008.
PCT/US2009/036142 International Preliminary Report on Patentability dated Sep. 16, 2010.
PCT/US2009/036142 International Search Report dated Jan. 7, 2010.
PCT/US2009/036142 Written Opinion dated May 11, 2009.

(56) References Cited

OTHER PUBLICATIONS

PCT/US2009/047662 International Preliminary Report on Patentability dated Jan. 13, 2011.
PCT/US2009/047662 Written Opinion dated Aug. 20, 2009.
PCT/US2010/021199 International Search Report and Written Opinion dated Mar. 22, 2010.
PCT/US2010/021199 International Preliminary Report on Patentability dated Mar. 29, 2011.
PCT/US2010/021218 International Search Report and Written Opinion dated Mar. 23, 2010.
PCT/US2010/021218 International Report on Patentability dated Feb. 2, 2011.
PCT/US2010/025650 International Search Report and Written Opinion dated Apr. 22, 2010.
PCT/US2010/025650 International Report on Patentability dated Mar. 14, 2011.
PCT/US2010/025952 International Search Report and Written Opinion dated Apr. 12, 2010.
PCT/US2010/025952 International Report on Patentability dated Mar. 14, 2011.
PCT/US2009/047667 International Report on Patentability dated Jan. 13, 2011.
PCT/US2009/047667 Written Opinion dated Aug. 7, 2009.
PCT/US2009/047667 International Search Report dated Dec. 30, 2009.
Dresser-Rand, Inc. "High Pressure Air Compressor Model 13NL45," Oct. 28, 1991, 14 pages.

\* cited by examiner

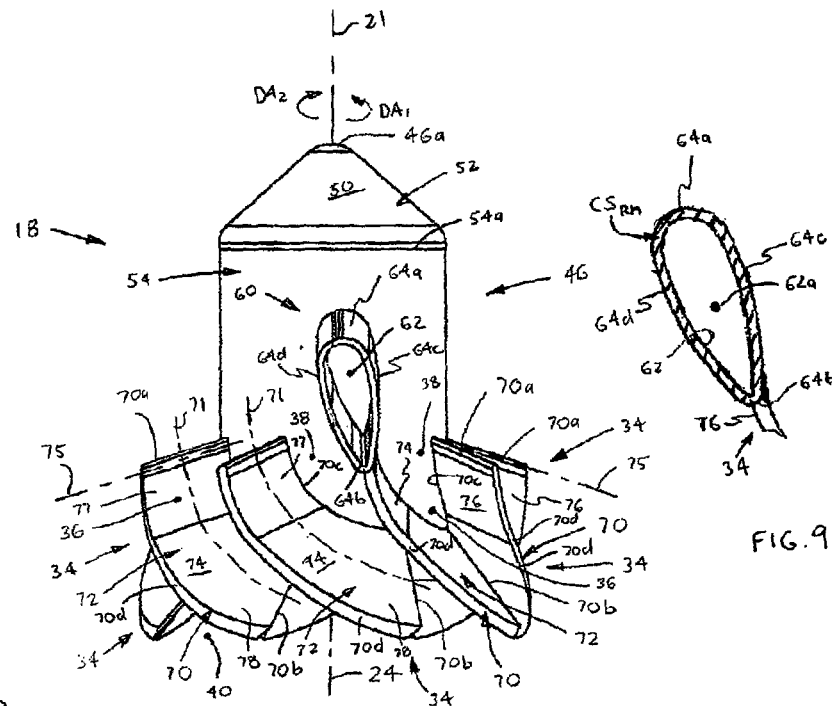
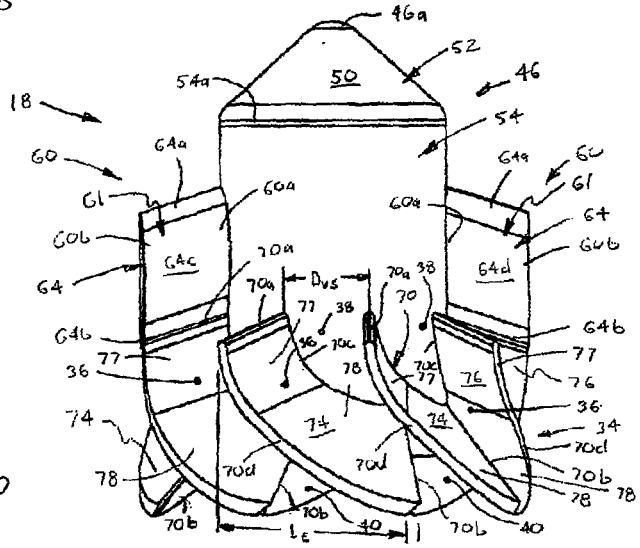
FIG. 8
FIG. 9
FIG. 10

STATIC FLUID SEPARATOR DEVICE

CROSS REFERENCE TO RELATED APPLICATIONS

This application is a United States national phase application of co-pending International patent application number PCT/US2007/020768, filed Sep. 26, 2007, which claims priority to U.S. Provisional Patent Application No. 60/847,354, filed Sep. 26, 2006, the disclosures of which are incorporated herein by reference.

The present invention relates to fluid machinery, and more particularly to static fluid separator devices.

Fluid separators, are known and are generally used to separate a mixed flow (e.g., solids and fluids, liquids and gases, etc.) into different phases of fluid, fluids of varying density, and/or to separate solids from fluids. One type of static separator is a "cyclonic separator" which induces swirling motion to a fluid stream such that heavier fluids (e.g., liquids) within a fluid stream are directed to move radially outwardly from a remaining portion of a fluid stream by centrifugal forces.

SUMMARY OF THE INVENTION

In one aspect, the present invention is a fluid separator comprising a generally tubular main body having a central axis, inlet and outlet ends spaced apart along the axis, inner and outer surfaces extending circumferentially about the axis, and at least one drain passage extending generally radially between the inner and outer surfaces. The main body inner surface defines a central flow passage and the tubular body is configured such that at least a portion of liquid contacting the inner surface flows through the at least one drain passage. A deflector is disposed within the main body flow passage and includes a central hub disposed generally on the central axis and a plurality of vanes extending generally radially between the hub and the main body inner surface. Each vane has a first channeling surface facing generally toward the main body inlet end and a second channeling surface facing generally away from the inlet end, each vane being generally angled with respect to the main body central axis such that the first channeling surface also faces generally toward the main body inner surface.

In another aspect, the present invention is again a fluid separator comprising a generally tubular body having a central axis, inlet and outlet ends spaced apart along the axis, inner and outer surfaces extending circumferentially about the axis, the inner surface defining a central flow passage, and at least one drain passage extending generally radially between the inner and outer surfaces. The inlet end is connectable with a fluid source such that fluid flows through the inlet end and into the flow passage and the main body is configured such that at least a portion of liquid contacting the inner surface flows through the at least one drain passage. A fluid deflector is disposed within the flow passage and includes a central hub located generally on the central axis and a plurality of vanes extending generally radially between the hub and the tubular body inner surface. Each vane is configured to direct fluid contacting the vane at least generally toward the tubular member inner surface. The fluid separator also has at least one, and preferably all, of the following structural elements or limitations: 1) the at lease one drain passage is a generally endless slotted opening extending circumferentially about the separator axis; 2) the drain passage has an inlet at the main body inner surface, an outlet at the main body outer surface, and extends partially axially through the main body such outlet is spaced axially from the inlet in a direction generally toward the main body outlet; 3) each vane has inlet and outlet ends and an axial length between the inlet and outlet ends, the at least one drain passage being spaced from all of the vane outlet ends by a distance of about one-half the vane axial length; and 4) the separator includes first and second, axially spaced apart drain passages, the first drain passage being disposed generally between the deflector and the second drain passage, each drain passage having an axial width and the first drain passage width being substantially greater than the second drain passage width.

In a further aspect, the present invention is a once again a fluid separator comprising a generally tubular body having a central axis, inlet and outlet ends spaced apart along the axis, inner and outer surfaces extending circumferentially about the axis, the inner surface defining a central flow passage, and at least one drain passage extending generally radially between the inner and outer surfaces. The inlet end is connectable with a fluid source such that fluid flows through the inlet end and into the flow passage and the main body is configured such that at least a portion of liquid contacting the inner surface flows through the at least one drain passage. A fluid deflector is disposed within the flow passage and includes a central hub located generally on the central axis and a plurality of vanes extending generally radially between the hub and the tubular body inner surface.

Each vane is configured to direct fluid contacting the vane at least generally toward the tubular member inner surface. The fluid separator further has at least one, and preferably all, of the following structural elements/limitations: 1) the main body inner surface has an inside diameter and the hub has an outside diameter, the hub inside diameter having a value of at least about one-half a value of the body inside diameter; and/or 2) the hub has opposing inlet and outlet axial ends and a generally conical deflector surface at the inlet end, the conical surface being configured to direct fluid contacting the surface to flow generally toward the main body inner surface.

In yet another aspect, the present invention is once again a fluid separator comprising a casing having an inner circumferential surface defining an interior chamber and a generally tubular separator main body having inlet and outlet ends, inner and outer circumferential surfaces, and at least one drainage opening extending generally radially between the two surfaces. The separator main body is disposed within the casing chamber so as to define a collection chamber between the casing inner surface and the separator outer surface and the inner surface define a central flow passage. A deflector is disposed within the flow passage and is configured to direct fluid contacting the deflector generally toward the separator inner surface, the deflector including a hub with a central bore fluidly connected with the flow passage and a plurality of vanes, each vane extending generally radially between the hub and the main body inner surface. At least one recirculation member has an outer surface, a first end connected with the separator main body, a second end connected with the hub, a central bore extending between the two ends. The central bore is configured to fluidly connect the collection chamber with the deflector hub bore and a central axis extends through the bore. The fluid separator also has at least one, and preferably all, of the following structural limitations or elements: the recirculation member has generally oval-shaped cross sections extending generally perpendicularly through the recirculation member axis; 2) the recirculation member is arranged such the recirculation member axis defines an acute angle with respect to the separator central axis so that fluid contacting the tube outer surface is directed generally toward the main body inner circumferential surface; and/or 3) the recirculation member is integrally formed with one of the plurality of vanes.

In yet an even further aspect, the present invention is yet again a fluid separator comprising a generally tubular body having a central axis, inlet and outlet ends spaced apart along the axis, inner and outer surfaces extending circumferentially about the axis, the inner surface defining a central flow passage, and first and second drain passages extending generally radially between the inner and outer surfaces. The inlet end is connectable with a fluid source such that fluid flows through the inlet end and into the flow passage and the main body is configured such that at least a portion of liquid contacting the inner surface flows through the at least one drain passage. The first drain passage is located generally axially between the inlet and the second drain passage and each one of the first and second drain passages has an axial width, and the first drain passage axial width being substantially greater than the second drain passage width.

In yet another aspect, the present invention is once again a fluid separator comprising a generally tubular main body having a central axis, inlet and outlet ends spaced apart along the axis, inner and outer surfaces extending circumferentially about the axis, the inner surface defining a central flow passage, and at least one drain passage extending generally radially between the inner and outer surfaces. The inlet end is connectable with a fluid source such that fluid flows through the inlet end and into the flow passage and the main body is configured such that at least a portion of liquid contacting the inner surface flows through the at least one drain passage. A fluid deflector is disposed within the flow passage generally proximal to the main body inlet end and is configured to direct fluid contacting the deflector at least generally toward the main body inner surface. Further, an axial flow channeling device is disposed within the flow passage generally proximal to the main body outlet end such that the at least one drain passage is located generally between the fluid deflector and the axial channeling device. The axial channeling device is configured to direct fluid to flow generally along the separator central axis and out of the main body outlet end.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 8 is a perspective view of the fluid deflector, showing a view through a recirculation passage of a recirculation member;

FIG. 9 is an enlarged, radial cross-sectional view of one recirculation member;

FIG. 10 is another perspective view of the fluid deflector, showing the side surfaces of the recirculation member;

DETAILED DESCRIPTION OF THE INVENTION

Figure 1:
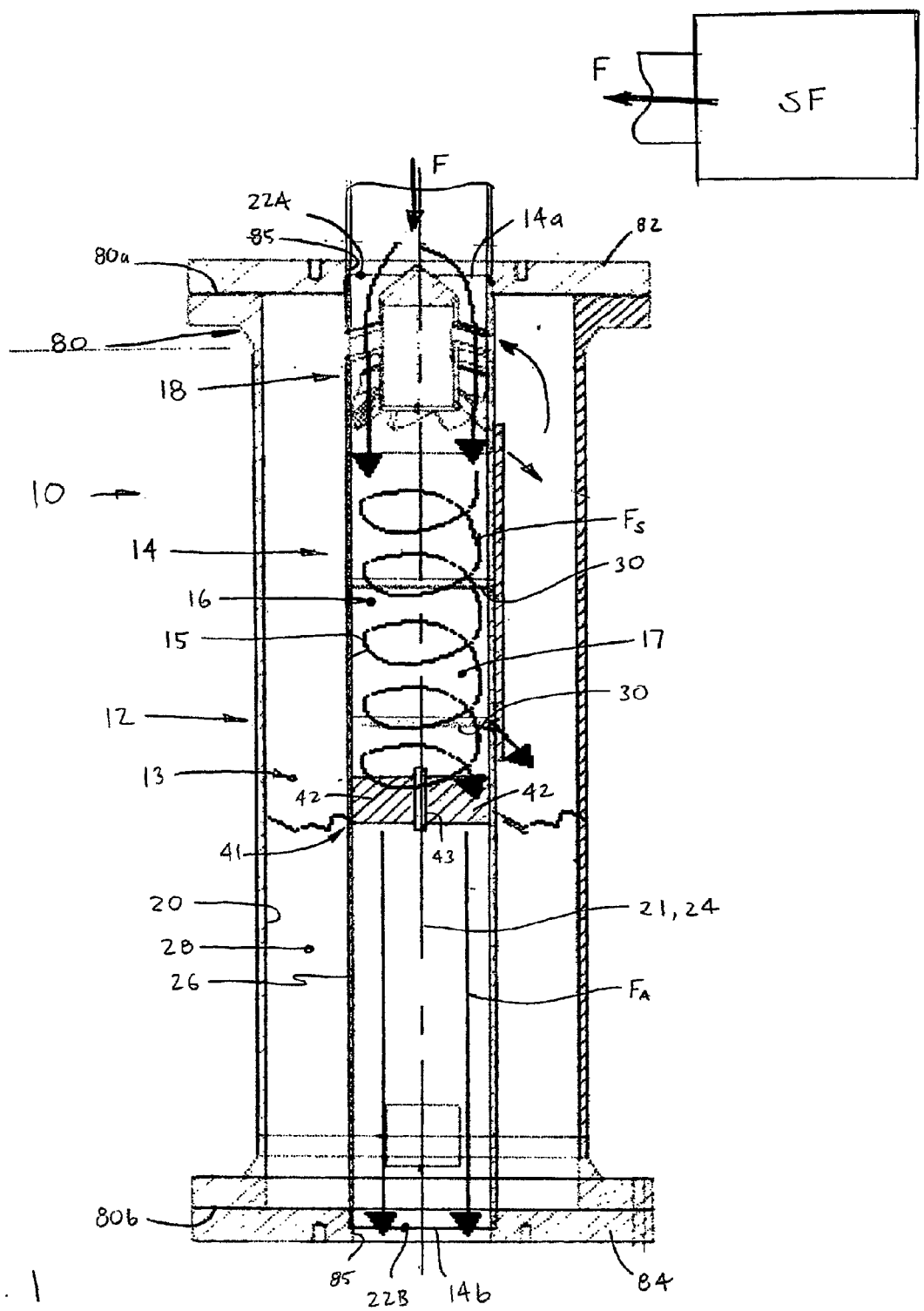
FIG. 1 is an axial cross-sectional view of a separator in accordance with the present invention.
Figure 2:
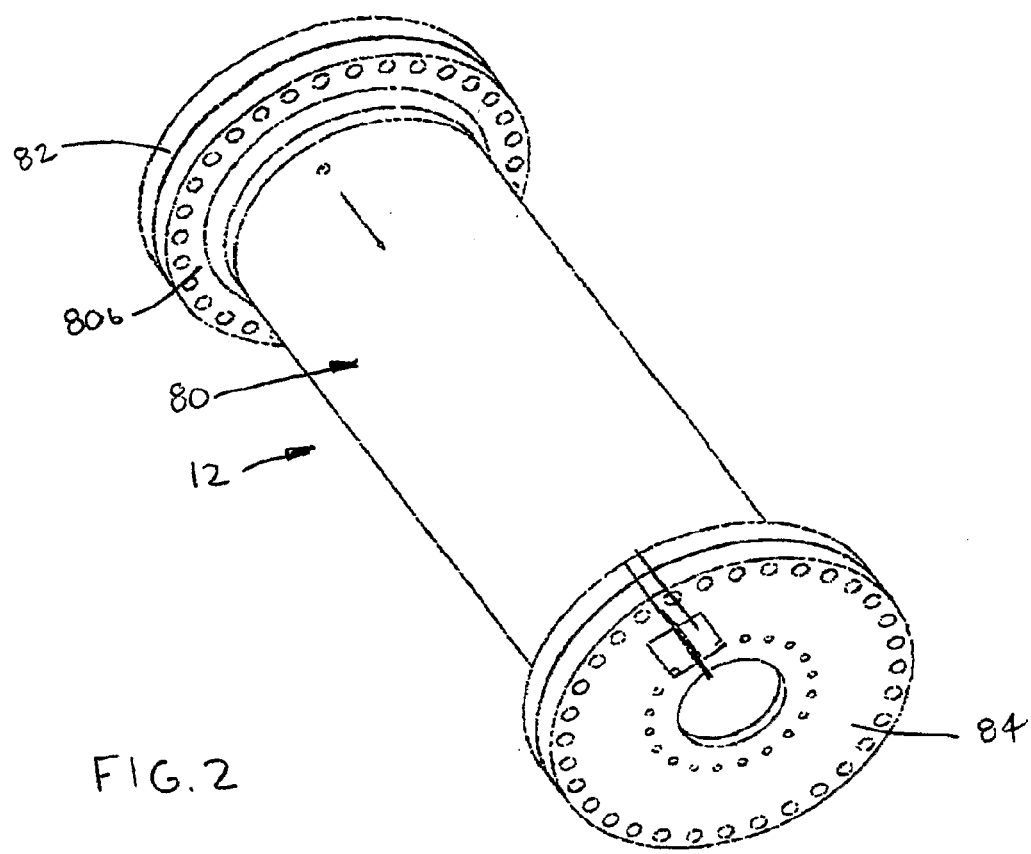
FIG. 2 is a perspective view of the separator.
Figure 3:
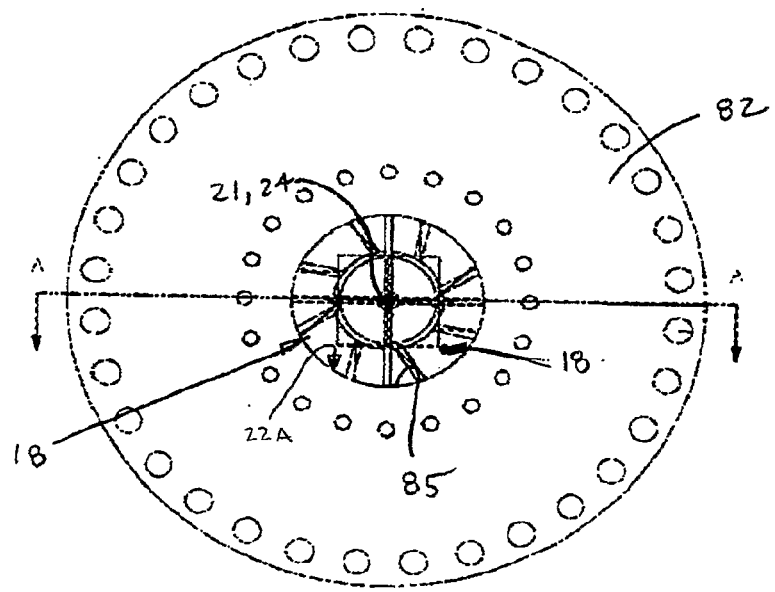
FIG. 3 is a radial end plan view of the separator.

Certain terminology is used in the following description for convenience only and is not limiting. The words "right", left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-13 an improved "static" fluid separator 10 that basically comprises a casing 12 with an interior chamber 13, a generally tubular main body 14 disposed within the chamber 13 and having an inner circumferential "separation" surface 15 bounding a central flow passage 16, and a fluid deflector 18 disposed within the separator flow passage 16 and configured to direct fluid generally toward the separator main body inner surface 15. The casing 12 has an inner circumferential surface 20 defining the interior chamber 13 and a central axis 21 extending longitudinally through the chamber 13. The separator main body 14 has inlet and outlet ends 14a, 14b, respectively, each end having a port 22A, 22B, respectively, each fluidly connected with the passage 16, and a central axis 24 extending between the two ends 14a, 14b, which is at least generally parallel to the casing axis 21 and most preferably generally collinear therewith.

Further, the separator main body 14 also has an outer circumferential surface 26, such that a collection chamber 28 is defined between the casing inner surface 20 and the separator body outer surface 26, and at least one and preferably a plurality of separation or "drain" passages 30. Each separation/drain passage 30 extends generally radially between the main body inner and outer surfaces 20, 26 and fluidly connects the flow passage 16 with the collection chamber 28. Furthermore, the separator body inlet port 22A is connectable with a fluid source SF (FIG. 1) such that a fluid stream F flows through the inlet port 22A and into the flow passage 16. The fluid stream F then flows through the fluid deflector 18 and is directed at least generally toward the separator body inner surface 15, such that at least a portion of a liquid within the stream F contacts the inner surface 15, so as to be separated from the remaining fluid (i.e., which is substantially gaseous), and thereafter flows through the at least one drain passage 30 and into the collection chamber 28.

Preferably, the fluid deflector 18 is basically a "swirler" device that includes a plurality of vanes 34 spaced circumferentially about the separator axis 24, each vane 34 being configured to direct fluid contacting the vane 34 at least generally toward the separator body inner surface 15. More specifically, the plurality of vanes 34 define a plurality of flow channels 36 extending between each pair of adjacent vanes 34, each channel 36 having an inlet 38 and an outlet 40, as described in further detail below. The plurality of vanes 34 are configured to direct flow through each channel 36 such that a fluid stream F flowing generally axially into the channel inlet 38 is directed to flow generally circumferentially and radially outwardly from the channel outlet 40. As such, with the plurality of circumferentially spaced outlets 40 each directing a separate fluid stream portion $f_P$ radially outwardly in a separate circumferential and axial, generally spiral shaped path $P_C$ (see FIG. 7), a swirling fluid stream section $F_S$ (FIG. 1) is generated within a swirl chamber section 17 of the separator flow passage 16, as described below. Thereby, the swirling fluid stream $F_S$ causes liquid portions of the swirling stream $F_S$ to be directed onto the separator surface 15 so as to be removed from the fluid stream F prior to flowing out of passage outlet port 22B.

Figure 4:
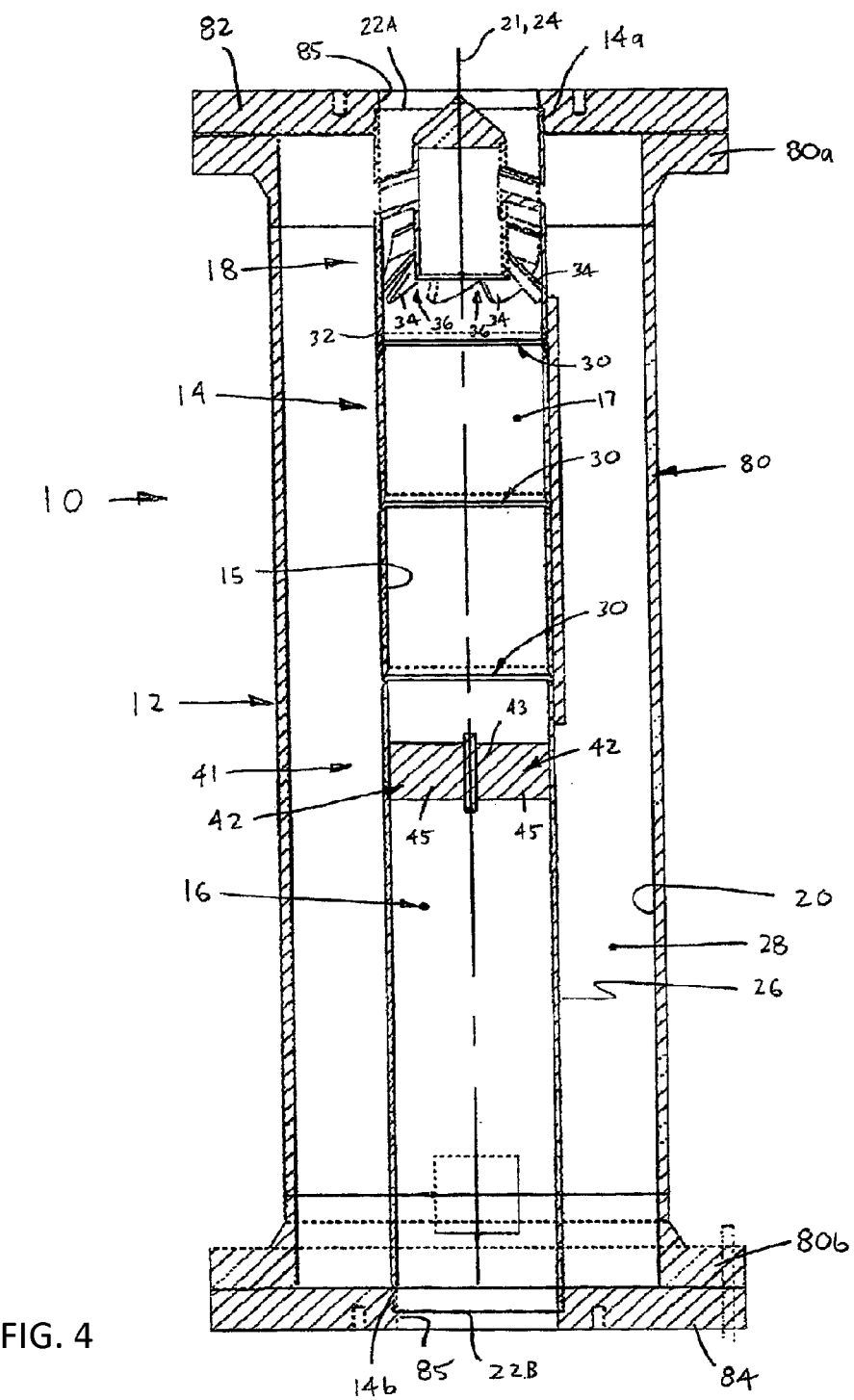
FIG. 4 is an enlarged axial cross-sectional view of the separator.
Figure 5:
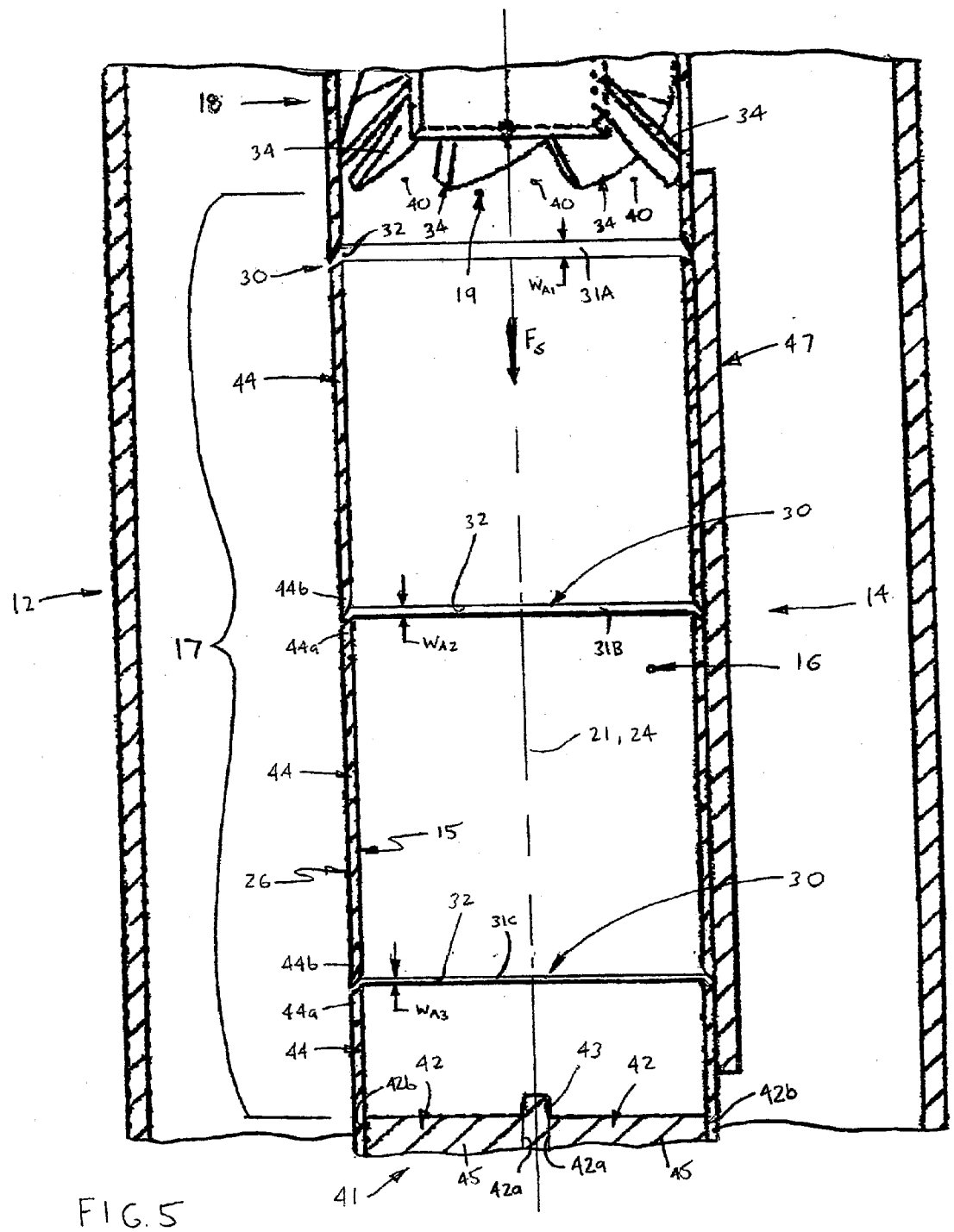
FIG. 5 is a more enlarged, broken-away axial cross-sectional view of a swirl chamber section of a separator body.

Referring to FIGS. 1, 4 and 5, the fluid separator 10 preferably further comprises an axial flow channeling device or "de-swirler" 41 disposed within the separator body flow passage 16 and configured to direct fluid to flow generally along the separator axis 24. The channeling device/de-swirler 41 is spaced axially from the at least one drain passage 30, specifically from the passage 30 most distal from the deflector 18, generally toward the separator outlet end 14b, such that the one or more drain passages 30 are disposed generally between the inlet port 22A and the channeling device 41. As such, the swirling fluid sections $F_S$ passing through the swirler chamber section 17 are subsequently "straightened" to flow as generally axial fluid sections $F_A$ after passing through the channeling device 41. Preferably, the axial channeling device 41 includes a plurality of blades 42 spaced circumferentially about the axis 24, preferably four blades 42, and a central support member 43 disposed generally on the axis 24. Each blade has an inner axial edge 42a connected with the support member 43 and an outer axial edge 42b connected with the main body inner surface 15. Further, each axial channeling blade 42 preferably includes a generally flat, generally rectangular plate 45 oriented generally parallel with or along the separator axis 24, such that fluid contacting the plate 45 is directed to flow generally along the axis 24. As such, the de-swirler 41 functions to eliminate or at least substantially reduce any swirl remaining in the fluid flow F exiting the swirler chamber section 17, so as to reduce frictional losses in the downstream gas piping system.

Figure 6:
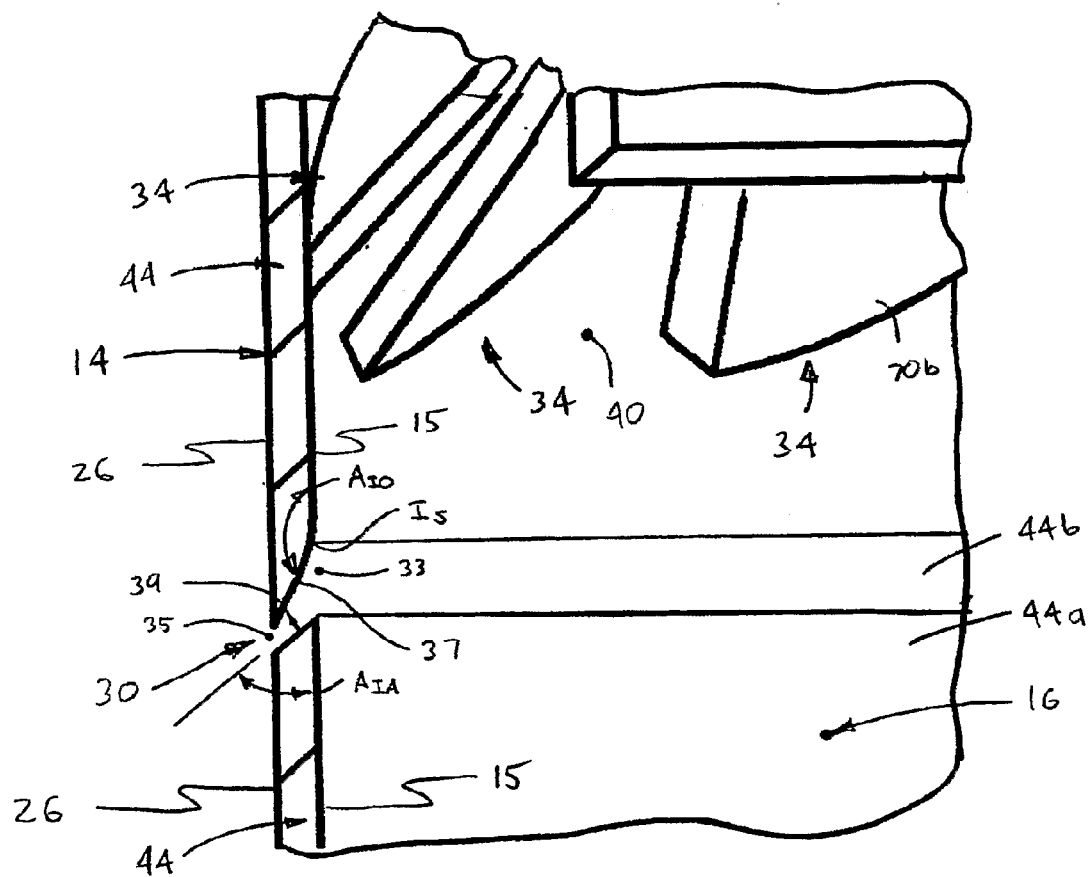
FIG. 6 is a greatly enlarged, broken-away axial cross-sectional view of the separator body, showing one drain passage.
Figure 7:
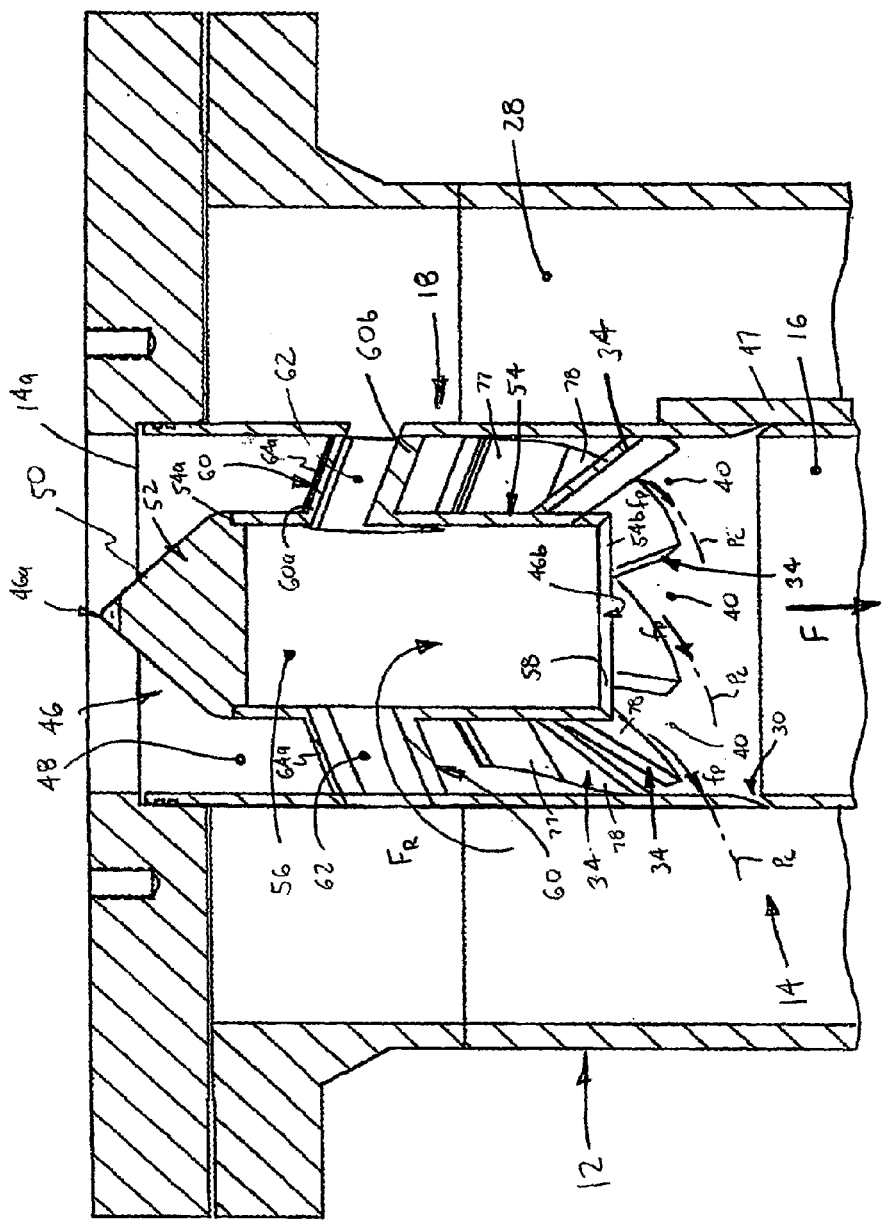
FIG. 7 is an enlarged, broken-away axial cross-sectional view of a fluid deflector of the separator.

Referring to FIGS. 4-6, the separator body 14 preferably has at least two drain passages 30 spaced apart along the separator axis 24, such that the swirl chamber section 17 is defined between an outlet 19 of the deflector 18 (i.e., collectively defined by the plurality of flow channel outlets 40) and a drain passage 30 located most distally from the deflector outlet 19. The first passage 30 is preferably located so as to be axially spaced from the deflector outlet 19 by a distance of about one-half the axial length of each vane 34, the subsequent passages 30 being arranged with respect to the first passage 30 to maximize fluid separation, as described below. Preferably, each drain passage 30 is a generally endless slotted opening 32 extending circumferentially about the separator axis 24 and having an inlet 33 at the separator body inner surface 15 and an outlet 35 at the separator body outer surface 26 (see FIG. 6). Further, each slotted opening 32 preferably extends partially axially through the separator body 14 such that the drain passage inlet 33 is located more proximal to the separator inlet end 14a than the passage outlet 35, i.e., the passage outlet 35 is spaced axially from the inlet 33 in a direction generally toward the main body outlet 14b. Thus, each drainage slotted opening 32 angles generally downwardly, as discussed in further detail below.

As best shown in FIG. 6, each slotted opening 32 is preferably defined between first and second radial surfaces 37, 39 extending circumferentially about the central axis 24. The first radial surface 37 is spaced axially from the second radial surface 39 such the first surface 37 is located more proximal to the separator inlet end 14a than the second radial surface 39. Preferably, the first end surface 37 intersects with the separator body inner surface 15 so as to define a generally obtuse angle $A_{IO}$ and the second surface 39 intersecting with the separator body inner surface 15 so as to define a generally acute angle $A_{IA}$. Furthermore, the intersection $I_S$ between the first radial surface 37 and the separator body inner surface 15 is preferably generally "radiused", such that the slotted opening inlet 33 has an axial width greater than an axial width of the slotted opening outlet 35. With this preferred separation opening structure, each passage inlet 33 facilitates entry into the associated passage 30 by liquid on the body inner surface 15 flowing axially toward the separator outlet end 14b.

Referring to FIGS. 4 and 5, the separator body 14 includes a plurality of connected together tubular body sections 44 each having opposing, first and second axial ends 44a, 44b. Each of the preferred slotted openings 32 is defined between a first axial end 44a of one tubular section 44a and a second axial end 44b of an adjacent tubular body section 44. In other words, each first radial end surface 37 is provided on the second axial end 44b of one tubular section 44 located more proximal to the separator inlet end 14a and each second radial surface 39 is provided on the first axial end of 44b of an adjacent tubular section 44 located more distally from the separator inlet end 14a. Further, the separator body 14 preferably further includes at least one and preferably a plurality of circumferentially spaced, generally axially-extending connector bars 47 configured to connect together the two or more tubular body sections 44. Each connector bar 47 has a first end or portion attached to one of the tubular body sections 44 and a second end/portion attached to an adjacent tubular body section 44 so as to connect the two body sections 44. Most preferably, each bar 47 extends axially between all of the tubular sections 44, as shown in FIG. 5, but may alternatively be arranged to only connect together two adjacent body sections 44.

Referring particularly to FIG. 5, the plurality of fluid drain passages 30 are preferably relatively sized having an axial width $W_{An}$ that progressively decreases from the first passage 31A to the second passage 31B, from the second passage to a third passage 31C, etc. For example, with an embodiment including three drain passages 30, the three passages 30 are arranged such that the third passage 31C is spaced axially from the first drain passage 31A in a direction $A_1$ toward the main body outlet 14b and the second passage 31B is disposed generally between the first and second drain passages 31A, 31B. Further, the first passage width $W_{A1}$ is substantially greater than the second passage width $W_{A2}$ and the second passage width $W_{A2}$ is substantially greater than the third passage width $W_{A3}$. Most preferably, the first drain passage 31A has an axial width $W_{A1}$ that provides about fifty percent (50%) of a total required drain area or volume, the second passage 31B has a width $W_{A2}$ that provides about thirty-five percent (35%) of the drain area/volume, and the third passage 31C has a width $W_{A3}$ providing about fifteen percent (15%) of the required drain area. As such, the majority of the "coarse" liquids which are relatively easily separated from the fluid stream F pass through the first passage 31A, the subsequent passages (e.g., 31B, 31C, etc.) provide for separation of the finer fluid particles from the stream F. Further, the separator 10 may be configured for a particular application by constructing or adjusting or number of drain passages 30, the total length of the swirl chamber 17 and the relative width of each passage 30 to account for the total amount of liquid expected through the separator 10 and the expected velocity of fluid stream within the swirl chamber section 17.

Figure 11:
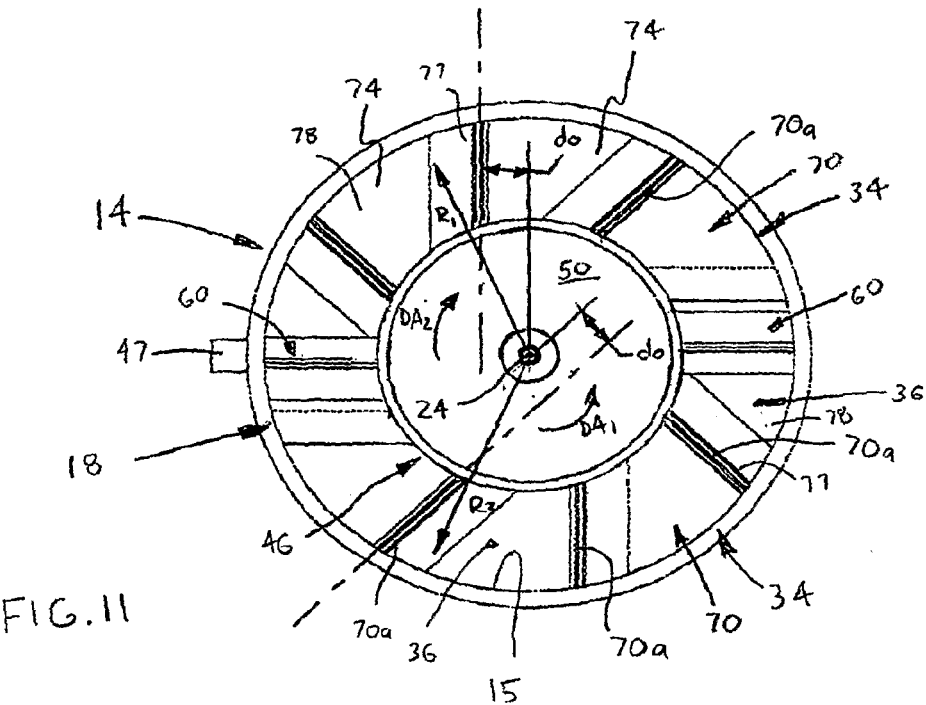
FIG. 11 is top plan view of the deflector.

Referring to FIGS. 7, 8 and 10-13, the deflector 18 preferably includes a central body or hub 46 disposed generally on the separator axis 24 so as to define an annular flow passage 48 between the central body 46 and the separator body inner surface 15. The deflector vanes 34 are disposed within the annular passage 48 so as to extend generally radially between the central body/hub 46 and the separator body inner surface 15, thus dividing the annular flow passage 48 into the plurality of discrete flow channels 36 as described above. More specifically, the separator body 14 has an inside diameter $ID_S$ and the deflector central body 46 has an outside diameter $OD_D$, as indicated in FIG. 11, and the value of the deflector body outside diameter $OD_D$ is preferably a substantial portion of a value of the separator body inside diameter $ID_S$. As such, the annular passage 48 is located substantially proximal to the separator body inner surface 15; in other words, the deflector central body 46 is sized to occupy a substantial portion of the separator body cross-sectional area (not indicated), so that the remaining "unoccupied" area remaining for the annular passage 48 is generally adjacent to the separator inner surface 15. Most preferably, the deflector body outside diameter $OD_D$ has a value of about one half (½) the value of the separator body inside diameter $ID_S$.

Further, the deflector central body 46 preferably has first and second, opposing axial ends 46a, 46b, the first end 46a being located more proximal to the separator inlet end 14a than the second body end 46b. The first body end 46a is preferably configured to direct fluid contacting the first end 46a generally radially outwardly and away from the separator axis 24. More specifically, the deflector body 46 preferably includes a generally conical deflector surface 50 at the body first end 16a, the conical surface 50 being arranged such that fluid contacting the surface 50 is directed generally radially away from the separator axis 24 and generally axially toward the deflector vanes 34. Preferably, the deflector central body 46 preferably includes a generally conical body section 52 providing the central body first end 46a and a generally cylindrical or tubular body section 54 with opposing first and second ends 54a, 54b. The conical body section 52 is connected with the tubular body first end 54a and provides the deflector surface 50, and the tubular body second end 54b provides the deflector body second end 46b.

Referring now to FIGS. 8-13, the deflector hub 46 preferably has an interior chamber 56 and a port 58 fluidly connecting the deflector chamber 56 with the separator flow passage 16 and the deflector 18 further includes at least one and preferably a plurality of recirculation members 60. Each recirculation member 60 has an outer surface 61, a first end 60a connected with the deflector hub 46, a second end 60b connected with the separator main body 14, a central passage or bore 62 extending between the two ends 60a, 60b, and a central axis 62a (FIG. 12) extending through the passage 62. The recirculation member passage 62 is configured to fluidly connect the collection chamber 28 with the deflector body interior chamber 56, such that a recirculation flow $F_R$ of gases within the collection chamber 28 may be reintroduced into the fluid stream F so as to pass through the outlet port 22B. Preferably, each recirculation member 60 is arranged such the recirculation member axis 62a defines an acute angle $A_{RE}$ with respect to the separator central axis 24 so that fluid contacting the recirculation member outer surface 61 is directed generally radially toward the main body inner circumferential surface 15. That is, the recirculation member outer surface 61 has a first or "inlet" edge surface section 64a (described below) facing generally toward the main body inlet end 14a and the recirculation member second end 60b is spaced axially from the member first end 60a in a direction generally toward the main body outlet end 14b. As such, fluid contacting the radially-outwardly angled or "outwardly inclined" inlet surface section 64a is directed or defected to flow in a generally radially outward direction toward the second end 64b, and thus toward the main body inner surface 15.

Figure 12:
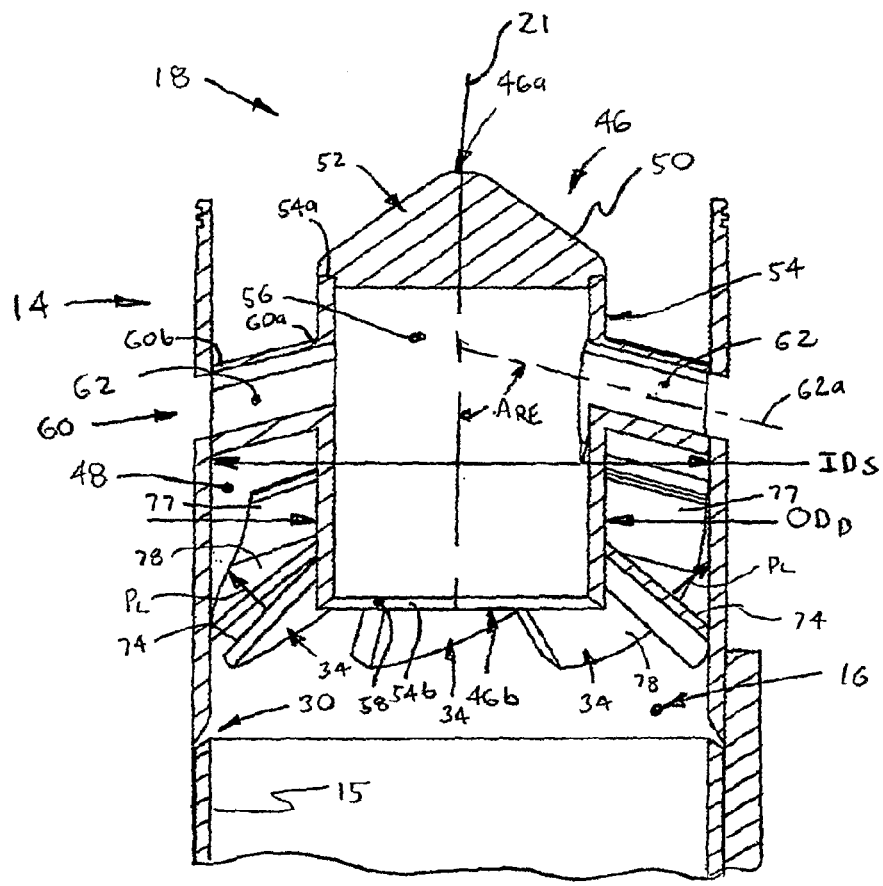
FIG. 12 is another axial cross-sectional view of the fluid deflector.

Preferably, each recirculation member 60 is either disposed generally above (and preferably connected with) one of the deflector vanes 34 (FIGS. 8 and 9) or is integrally formed with one of the vanes 34 (FIG. 12). More specifically, in one embodiment shown in FIGS. 7-12, each recirculation member 60 includes a generally oval-shaped tubular body 64 having generally oval-shaped cross sections $CS_{RM}$ extending generally perpendicularly through the recirculation member axis 62a, as indicated in FIG. 9. The oval-shaped tubular body 64 is formed such that the outer surface 61 has first and second edge surface sections 64a, 64b extending between the body first and second ends 60a, 60b, the first edge surface 64a being an "upper" surface and the second edge surface 64b being a "lower" surface spaced axially from the first, upper edge surface 64a in a direction toward the main body outlet 14b. A pair of opposing, generally convex first and second side surface sections 64c, 64d each extend generally axially between the first and second edge surface sections 64a, 64b. Further, at least one of the first and second side surface sections 64c, 64d is configured to direct fluid contacting the recirculation member outer surface 61 at least generally toward at least one of the deflector vanes 34.

Furthermore, each recirculation member 60 is generally angled such that the first side surface section 64c faces generally toward the main body inlet end 14a and the second side surface section 64d faces generally toward the main body outlet end 14b. Preferably, the recirculation member second edge surface section 64b is connected with the inlet end 70a of one of the plurality of vanes 34, such that the first and second side surface sections 64c, 64d is generally faired into a separate channeling surface 74, 76 (described below) of the vane 34. However, in another embodiment shown in FIG. 12, the at least one recirculation member 60 is integrally formed with one of the plurality of deflector vanes 34. That is, the vanes 34 are preferably constructed such that a recirculation passage 62 extends through one or more, and preferably all, of the vanes 34 between opposing vane side edges 70c, 70d, as described below.

34. With either structure, recirculation member 60 is shaped and positioned so as to be generally "streamlined" with respect to the fluid stream flowing from the main body inlet 14a toward the deflector 18. For example, the planar area of each recirculation member 60 that extends generally perpendicular to the flow direction is substantially reduced in comparison to a generally circular recirculation member/tube having about the same cross-sectional flow area, such that each recirculation member 60 is substantially less "obstructive" to the flow.

Referring to FIGS. 8 and 10-13, each vane 34 preferably has a generally curved body 70 with inlet and outlet ends 70a, 70b, the vane body 70 extending generally axially and generally circumferentially about the separator axis 24 between the two ends 70a, 70b. As such, fluid contacting each vane 34 is directed generally circumferentially about the axis 24 and radially outwardly toward the separator body inner surface 15. Furthermore, all of the vane bodies 70 at least partially extend circumferentially in the same one of two opposing angular directions $DA_1$ (as shown) or $DA_2$ about the separator body axis 24. That is, the vane bodies 70 each have a longitudinal centerline 71 extending between the body inlet and outlet ends 70a, 70b and the vanes 34 are arranged 24 such that each vane centerline 71 extend both generally axially and generally radially in the same angular direction $DA_1$, $DA_2$ about the separator central axis 24. As such, the vanes 34 are arranged/configured to direct a fluid stream F contacting at least two or more of the vanes 34 to generally swirl in one of the two opposing angular directions $DA_1$, $DA_2$ about the separator central axis 24.

Furthermore, by having a bended body 70 arranged as described above, each vane 34 generally "overlaps" the outlet end 70b of an adjacent vane 34, preferably by at least by at least one quarter of the spacing or pitch between adjacent vanes 34. In other words, the circumferential spacing distance $D_{VS}$ between the inlet ends 70a (and all other sections) of two adjacent vanes 34 is lesser than the circumferential length or extent $L_C$ of each vane 34, such that each vane outlet end 70b is disposed beneath a portion of one adjacent vane 34 (see FIG. 9).

With this structure, each flow channel outlet 40 is spaced laterally or circumferentially from the associated inlet 38. With this structure, fluid entering generally centrally through a channel inlet 38 cannot pass through without contacting at least the vane 34 which extends across the particular flow channel 36, which is preferably a suction surface 74 of the vane 34 as described below.

Figure 13:
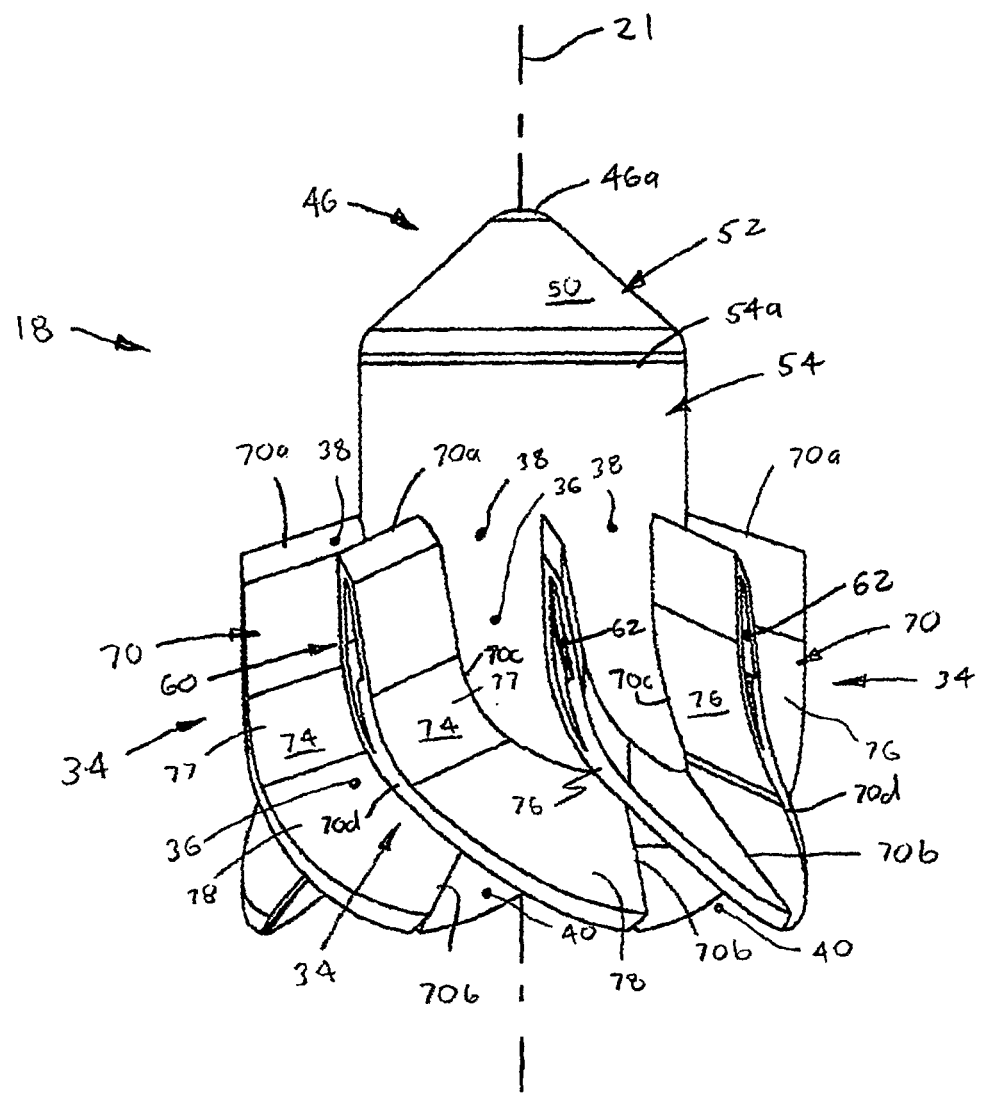
FIG. 13 is a perspective view of an alternative fluid deflector device having recirculation members integral with the deflector vanes.

Referring to FIGS. 8, 10 and 13, each vane body 70 is preferably provided by a curved plate 72 of generally uniform thickness, and most preferably a thickness that is less than ten percent (10%) of a spacing distance $D_{VS}$ (see FIG. 10) between adjacent vanes 34 so as to minimize pressure losses in the fluid stream F when passing through the deflector 18. Preferably each vane body 70 further has first and second, opposing channeling surfaces 74, 76 extending between the inlet and outlet ends 70a, 70b. The first channeling surface 74 is a "suction" surface and faces generally toward the separator inlet end 14a and the second surface 76 is a "pressure" surface and faces generally away from the separator inlet end 14a (i.e., towards the outlet end 14b). Preferably, each vane body 70 is angled such that the first channeling surface 74 faces generally toward the separator body inner surface 15, so that flow contacting either channeling surface 74, 76 is directed generally radially outwardly or away from the separator axis 24, and thus toward the separator inner surface 15.

More specifically, each vane body 70 further has first and second side edges 70c, 70d extending between the inlet and outlet ends 70a, 70b. The first or inner side edge 70c extends proximal to the deflector hub 46 and the second or outer side edge 70d extends proximal to the separator body inner surface 15. The two side edges 70c, 70d of each body 70 are preferably spaced apart axially such that the first side edge 70c is located more proximal to the separator inlet end 14a than the second side edge 70d. In other words, each vane body 70 is preferably arranged with respect to the hub 46 such that lateral centerlines 75 of each body 70 are generally angled toward the separator outlet end 14b in a radial outward direction, as best shown in FIG. 8. That is, the vanes 34 are arranged such that lines $L_P$ perpendicular to each suction surface 74 extend generally toward the separator body inner surface 15, as indicated in FIG. 11. As such, each vane pressure channeling surface 74 faces generally toward the separator inner surface 15, as described above, such that fluid (particularly liquids) contacting the vane surfaces 74, 76 flow generally radially toward the separator body inner surface 15.

Referring again to FIGS. 8 and 10-13, each vane body 70 most preferably includes a first generally axial body section 77 providing the body inlet end 70a and a second, substantially curved body section 78 with a generally constant radius (not indicated) about the separator central axis 24. The axial section 77 preferably has a length along the centerline 71 that is about twenty percent (20%) of the total axial length (not indicated) and is preferably radiused at the inlet end 70a so as to minimize pressure drop through the deflector flow channels 36. Further, the outlet end 70b of the preferred curved body section 78 is preferably beveled to a sharp edge to facilitate shearing of liquid off of the vane surfaces 74, 76 during movement toward the separator body inner surface 15.

Referring particularly to FIG. 11, each vane 34 is preferably further arranged or oriented so as to only extend generally radially with respect to the separator axis 24 and not substantially or precisely radially. More specifically, each vane 34 is generally angled with respect to, and generally intersects, radial lines $R_n$ (e.g., $R_1$, $R_2$, etc.) through the separator axis 24, such that a lateral centerline 75 of the vane 34 is spaced or offset by a perpendicular distance $d_O$ from separator axis 24. As such, the vane suction surface 74 faces generally toward the separator body inner surface 15, so that fluid flowing through the channel inlet 38 bounded by the suction surface 74 and is deflected generally toward the separation body surface 15.

Referring now to FIGS. 1-4, the casing 12 preferably includes a generally tubular body 80 having opposing ends 80a, 80b and first and second generally circular end caps 82, 84 each disposed at a separate one of the two ends 80a, 80b and having an opening 85. The cap openings 85 are each aligned with the other opening 85 and the separator body 14 is disposed within the two openings 85, the separator inlet end 14a being located at least generally proximal to the first end cap 82 and the outlet end 14b being located at least generally proximal to the second end cap 84. Preferably, the casing axis 21 extends generally vertically, such that the first end cap 82 is located generally vertically above the second end cap 84 and the tubular separator member 14 extends generally vertically through the casing 12. As such, fluid passing through the drain passages 30 flows by gravity toward a lower end of the collection chamber 28. However, the separator 10 may be arranged such that the casing and separator axes 21, 24 extend generally horizontally or be angled to extend both horizontally and vertically.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A fluid separator, comprising:
a casing having an inlet port and an outlet port;
a tubular body disposed at least partially in the casing and defining an annular collection chamber therebetween, the tubular body having an inlet end fluidly coupled to the inlet port of the casing, and an outlet end fluidly coupled to the outlet port, and the tubular body defining a plurality of drainage passages in fluid communication with the annular collection chamber;

a deflector disposed at least partially in the tubular body and including a central hub and a plurality of vanes extending from the central hub toward an inner circumferential surface of the tubular body, the deflector configured to swirl a fluid such that at least a portion of a denser matter of the fluid is urged radially outward through the plurality of drainage passages and into the annular collection chamber and at least a portion of a less dense matter of the fluid is directed to the outlet end; and a recirculation member extending from the annular collection chamber to the central hub so as to provide fluid communication therebetween, the recirculation member being oriented such that the recirculation member extends radially inward from the inner circumferential surface of the tubular body and axially toward the inlet end to meet with the central hub, the recirculation member being configured to return at least a portion of any of the less dense matter that is directed through the plurality of drainage passages to an interior of the tubular body.

2. The fluid separator of claim 1, wherein the central hub defines a hub port facing the outlet end of the tubular body, such that the less dense matter received from the recirculation member is returned to the interior of the tubular body via the hub port.

3. The fluid separator of claim 1, wherein the recirculation member is defined within at least one of the plurality of vanes.

4. The fluid separator of claim 1, wherein the recirculation member is integrally-formed with at least one of the plurality of vanes.

5. The fluid separator of claim 1, wherein the recirculation member is airfoil-shaped in cross-section.

6. The fluid separator of claim 1, wherein the recirculation member defines a recirculation member central axis and the tubular body defines a tubular body central axis, the recirculation member central axis and the tubular body central axis intersecting to define an acute angle.

7. The fluid separator of claim 1, wherein the plurality of drainage passages comprises a first drainage slot and a second drainage slot, the second drainage slot being disposed between the outlet end of the tubular body and the first drainage slot.

8. The fluid separator of claim 7, wherein the first drainage slot has a first width and the second drainage slot has a second width, the second width being smaller than the first width.

9. The fluid separator of claim 8, further comprising a third drainage slot disposed between the outlet end and the second drainage slot, the third drainage slot having a third width, the third width being smaller than the second width.

10. The fluid separator of claim 9, wherein the plurality of drainage passages cumulatively define a total drainage area, the first drainage slot providing about 50% of the total drainage area, the second drainage slot providing about 35% of the total drainage area, and the third drainage slot providing about 15% of the total drainage area.

11. The fluid separator of claim 8, wherein the first drainage slot is axially spaced from the plurality of vanes by a distance of about one-half an axial length of one of the plurality of vanes.

12. The fluid separator of claim 1, wherein the plurality of drainage passages includes at least one endless slot, and the tubular body comprises two or more cylindrical segments separated by the at least one endless slot and connected together by one or more connecting rods.

13. The fluid separator of claim 1, wherein the deflector is disposed proximal the inlet end and the plurality of vanes are disposed at a substantially constant distance apart.

14. An apparatus for separating a fluid, comprising:

a first cylinder;

a second cylinder concentric with the first cylinder and defining an annulus therebetween, the second cylinder having inlet and outlet ends, inner and outer circumferential surfaces, and a plurality of drainage slots extending between the inner and outer circumferential surfaces such that an interior of the second cylinder is in fluid communication with the annulus via the plurality of drainage slots;

a central hub disposed at least partially in the second cylinder and having a port defined therein, the port being in fluid communication with the interior of the second cylinder;

a plurality of vanes extending radially from the central hub to swirl the fluid; and a recirculation member extending from the outer circumferential surface of the second cylinder to the central hub to provide fluid communication therebetween between the outer circumferential surface and the central hub, the recirculation member being disposed at an acute angle with respect to the second cylinder, such that the recirculation member extends radially inward from the inner circumferential surface of the second cylinder and axially toward the inlet end of the second cylinder to meet the central hub.

15. The apparatus of claim 14, wherein the plurality of drainage slots are axially offset from one another and each have a width, the widths of the plurality of drainage slots progressively decreasing proceeding axially from the inlet end and toward the outlet end.

16. The apparatus of claim 15, wherein the recirculation member is integrally-formed with at least one of the plurality of vanes and is positioned between at least one of the plurality of vanes and the inlet end.

17. The apparatus of claim 14, wherein the recirculation member is airfoil-shaped in cross-section.

18. The apparatus of claim 14, wherein the recirculation member is defined at least partially within at least one of the plurality of vanes.

19. A fluid separator, comprising:

a casing having an inlet port and an outlet port;

a tubular body disposed at least partially in the casing and defining an annular collection chamber therebetween, the tubular body having an inlet end fluidly coupled to the inlet port of the casing, and an outlet end fluidly coupled to the outlet port, and the tubular body defining first and second drainage slots, the second drainage slot being axially offset from the first drainage slot and disposed between the first drainage slot and the outlet end, the first and second drainage slots being in fluid communication with the annular collection chamber, and the second drainage slot having a width that is greater than a width of the first drainage slot;

a deflector disposed at least partially in the tubular body, the deflector including a central hub and a plurality of vanes extending from the central hub toward an inner circumferential surface of the tubular body, the deflector configured to swirl a fluid such that at least a portion of a denser matter of the fluid is urged radially outward through the first and second drainage slots and into the annular collection chamber and at least a portion of a less dense matter of the fluid is directed to the outlet end, the central hub defining a port in fluid communication with an interior of the tubular body; and a recirculation member extending from the annular collection chamber to the central hub so as to provide fluid communication between the annular collection chamber and the port of the central hub, the recirculation member being configured to recycle the at least a portion of the less dense matter that is directed through the first and second drainage slots.

20. The fluid separator of claim 19, wherein the recirculation member is disposed at a non-perpendicular angle with respect to a central axis of the tubular body.

21. The fluid separator of claim 20, wherein the recirculation member extends from the annular collection chamber radially inward and axially toward the inlet end to meet the central hub.

22. The fluid separator of claim 20, wherein the recirculation member is integrally-formed with at least one of the plurality of vanes.

* * * * *